United States Patent [19]
Harben, III

[11] Patent Number: 5,022,120
[45] Date of Patent: Jun. 11, 1991

[54] APPARATUS FOR REMOVING OIL BAG FROM FOWL

[76] Inventor: Grover S. Harben, III, 3319 Edgewater Ter., Gainesville, Ga. 30501

[21] Appl. No.: 429,088

[22] Filed: Oct. 30, 1989

[51] Int. Cl.⁵ .............................................. A22C 21/00
[52] U.S. Cl. .................................................... 452/115
[58] Field of Search ...................................... 17/11, 52

[56] References Cited

U.S. PATENT DOCUMENTS

| | | | |
|---|---|---|---|
| 3,213,488 | 10/1965 | Volpe | 17/11 |
| 3,417,424 | 12/1968 | Chamberlain | 17/11 |
| 3,744,087 | 7/1973 | Vertegaal | 17/11 |
| 4,183,118 | 1/1980 | Graham et al. | 17/11 |
| 4,245,372 | 1/1981 | Messner | 17/11 |
| 4,707,886 | 11/1987 | Simmons | 17/11 |

Primary Examiner—Willis Little
Attorney, Agent, or Firm—Jones, Askew & Lunsford

[57] ABSTRACT

Apparatus for removing the oil bag from killed fowl without cutting the tail of the fowl. A stationary knife assembly is mounted adjacent the predetermined path traveled by the birds along a conventional overhead conveyor. The stationary knife assembly has a V-shaped notch into which the oil bag of each bird moves, but a guard member partially blocks the notch and keeps the tail of the bird from entering the notch. A movable cutting assembly moves in synchronism with the bird conveyor and cooperates with the stationary knife assembly to shear the oil bag off the bird.

13 Claims, 2 Drawing Sheets

APPARATUS FOR REMOVING OIL BAG FROM FOWL

FIELD OF INVENTION

This invention relates in general to poultry processing apparatus, and relates in particular for apparatus for removing the oil bag or sac from poultry such as chicken and the like.

BACKGROUND OF THE INVENTION

The oil bag in a chicken is a gland located near the tail or bottom of the bird. This oil bag must be removed when the freshly-killed birds are processed for market. Although removal of the oil bag can be done manually with a knife, that procedure is labor-intensive and is not suited to modern poultry processing operations where each stage of poultry processing is mechanized to the greatest possible extent.

Machines intended for removing the oil bag are known in the prior art. Some examples of prior-art oil bag removing apparatus are found in U.S. Pat. Nos. 4,183,118; 4,532,676; 4,550,473; and 4,707,886. In the past, actual machines developed for removing oil bags of fowl moving along an overhead conveyor line has been relatively complex in construction and operation, increasing the costs of acquiring and operating that machinery. These machines generally move the birds in sequence past cutter elements of various kinds, and these cutter elements are positioned to sever and remove the oil bag as each bird reaches a predetermined position in relation to the cutter element. However, because the oil bag is located near the bottom of the bird, precise alignment of the bird with respect to the cutter element has proved necessary. If each bird is not aligned in an exact position relative to the cutter, part of the bird's tail may be cut off or the oil bag will not be completely removed. That unwanted cutting diminishes the value of the bird and is difficult to avoid with oil bag cutting apparatus of the prior art.

SUMMARY OF THE INVENTION

Stated in general terms, the present apparatus includes a stationary cutting element for mounting in relation to the path of oncoming birds moving along an overhead conveyor line. The cutting element defines an entry throat into which moves the oil bag of each bird moving along the conveyor line. A guide is located adjacent the entry throat of the cutting element, and this guide engages the tail of the oncoming birds to deflect the tail away from the entry throat, so that only the oil bag enters the entry throat. A knife interacts with the cutting element to shear off the oil bag within the entry throat.

Stated somewhat more particularly, the stationary cutting element includes a pair of sides converging to define a V-shaped entry throat for receiving and engaging the oil bag of each bird moving along the path of the conveyor. A guide member extends in that path in front of the throat. This guide member partially blocks the throat from one side of the throat, so that the guide member engages the tail of the oncoming birds and displaces the tail away from the entry throat. This displacement of the tail does not affect the oil bag, which moves into the entry throat and is severed from the bird.

Stated in greater detail, the fixed cutting element of the present invention is mounted adjacent a chain moving along a closed path below the overhead conveyor of the bird processing line. A number of movable cutting elements are carried by the chain to move successively along the fixed cutting element in shearing relation to the entry throat of the fixed cutting element. The movable cutting elements are carried by the chain in offset relation to the position of each fowl moved to the oil bag cutting apparatus by the overhead conveyor, so the oil bag of each such bird moves into the entry throat of the fixed cutting element and thereafter is sheared off by the movable cutting element offset from that bird.

Accordingly, it is an object of the present invention to provide an improved apparatus for removing the oil bag from fowl.

It is another object of the present invention to provide an oil bag removing apparatus of reduced mechanical complexity.

It is a further object of the present invention to provide an oil bag removing apparatus which prevents or minimizes cutting off part of the tail portion of the bird.

DESCRIPTION OF PREFERRED EMBODIMENT

Figure 1:
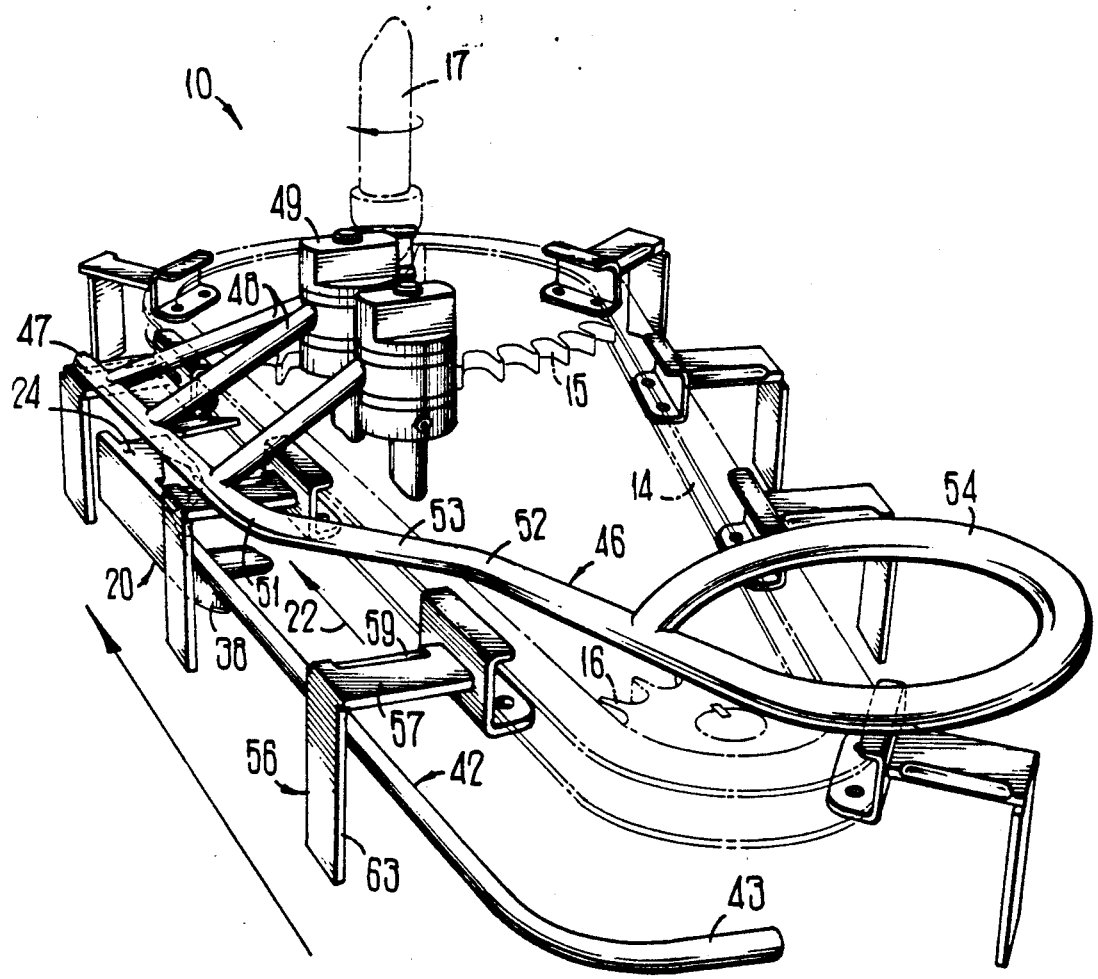
FIG. 1 is a pictorial view showing a preferred embodiment of the present invention, with the chain carrying the movable cutting elements being depicted in phantom lines for clarity of illustration.

Turning first to FIG. 1, there is shown generally at 10 an oil bag cutting apparatus intended for installation beneath the shackles 11 of a conventional overhead conveyor. Such overhead conveyors are commonplace in poultry processing installations and are well known to those skilled in the art. The cutting apparatus 10 includes an endless link chain 14 mounted on a pair of sprockets 15 and 16 oriented so that the chain and sprockets occupy a substantially horizontal plane a certain distance below the overhead conveyor and shackles. The chain 14 moves at a speed synchronized with that of the overhead conveyor, and for that purpose a drive shaft 17 extends upwardly from the sprocket 15 to engage a sprocket (not shown) or the like driven by the overhead conveyor. The sprocket 15 of the oil bag cutting apparatus 10 thus is driven by and in synchronism with the overhead conveyor, and the sprocket 16 functions as an idler for the chain 14 in the present apparatus.

Figure 2:
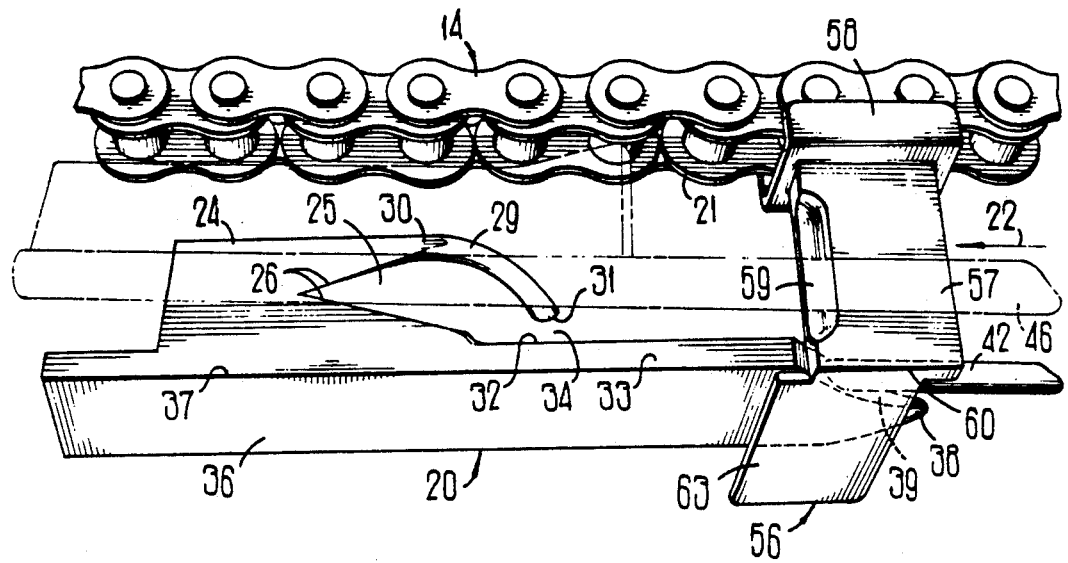
FIG. 2 is an enlarged fragmentary pictorial view showing the fixed cutting element and one of the movable cutting elements in the embodiment of FIG. 1, with the upper guide rail shown in phantom lines for clarity of illustration.

The front side 21 of the chain 14 moves in the same direction, indicated by the arrow 22 in FIG. 1, as the overhead conveyor and the birds suspended from the conventional shackles (not shown) suspended from the overhead conveyor. A stationary knife assembly 20, details of which are best seen in FIG. 2, is mounted along the front side 21, close to the point where the chain 14 enters the sprocket 15 on the front side 21. The alignment of the cutting apparatus 10, and in particular the path 22 traveled by the front side 21 of the chain, is selected relative to the path of the shackles so that the path indicated by the arrow 22 converges toward the travel path of the birds. With this orientation, birds suspended from the shackles will move toward the present cutting apparatus at an oblique angle to the front side 21 of the chain as explained more fully below.

Figure 3:
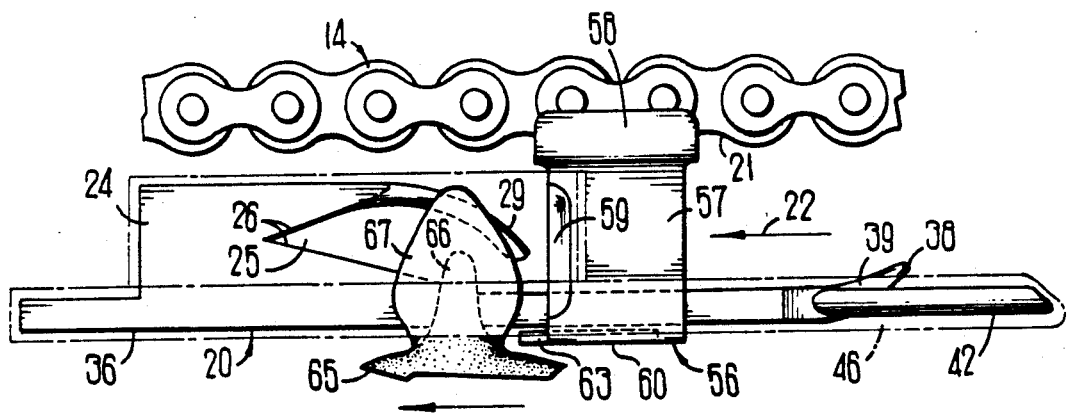
FIG. 3 is an overhead fragmentary view of the structure shown in FIG. 2, with a portion of a typical bird added for illustrative purposes.

The stationary knife assembly 20 includes a horizontal plate 24 spaced a short distance outside the chain 14 along the front side 21 thereof, as best seen in FIGS. 2 and 3. A generally V-shaped notch 25 is cut in the forward end of the plate 24, so that the notch defines an entry throat open to receive the oil bag of an oncoming bird moving in the direction indicated by the arrow 22. The edges 26 of the notch 25 are beveled from the underside of the plate 24 so as to provide an acute angle defining shearing edges on the notch.

A rod 29 extends forwardly from the side 30 of the V-shaped notch 25 positioned closer to the chain 21. The rod 29 preferably is cylindrical, and bends inwardly to extend partway across the throat of the notch 25 as the rod extends outwardly from the side 30. The outer end 31 of the rod 29 confronts the edge 32 of the horizontal surface 33 across a lateral gap 34 spaced a distance in front of the notch 25 and formed by a forward extension of the plate 24 in which the notch is formed. The rod 29 optionally may turn downwardly a small extent extending from the one side 30 to the outer end 31, so as to place the outer end of the rod slightly below the plane of the plate 24.

The stationary knife assembly 20 also includes a front plate 36 joining the horizontal plate 24 at the front side 37 thereof and extending downwardly a distance from that front side. The forward end of the front plate 36 extends a distance in front of the gap 34 and the outer end 31 of the rod 29, and terminates at a nose portion 38 below and turned inwardly from the plane of the front plate as best seen in FIG. 3. A ramp surface 39 extends upward the nose portion 38 to join the horizontal surface 33 near the forward end of the front plate 36.

A lower guide rod 42 joins the stationary knife assembly 20 at the ramp surface 39, and extends forwardly from the stationary knife assembly in substantially a horizontal plane as best shown in FIG. 1. The lower guide rod 42 extends forwardly beyond the idler sprocket 16 and terminates at an outer end 43 bent inwardly to lie partway around the idler sprocket and the chain 14, thereby helping prevent the arriving shackles birds from contacting the chain.

An upper guide rod 46, FIG. 1, is mounted in vertically spaced relation above the lower guide rod 42. The trailing portion 47 of the upper guide rod 46 is located above the stationary knife assembly 20, approximately in alignment with the horizontal surface 33 at the side of the V-shaped notch 25 opposite the rod 29 extending partway across the front of that notch. The trailing portion 47 of the second guide rod 46 is substantially parallel to the path 22 of oncoming birds. The struts 48 join the inside surface of the trailing portion 47 and extend inwardly for attachment to the fixed supports 49, thereby holding the entire upper guide rod 46 in place.

The upper guide rod 46 extends forwardly from the trailing portion 47 and bends inwardly at the point 51 located a short distance in front of the nose portion 38 formed on the front end of the stationary knife assembly 20. The guide rod 46 extends forwardly a distance from the bend 51 to a second bend 52, thereby defining a portion 53 of the second guide rod which extends inwardly almost to a point overlying the front side 21 of the chain 14. The second guide rod 46 extends forwardly from the second bend 52 to overlie the idler sprocket 16 and the chain 14 engaged by that sprocket, thereby guarding against contact with the sprocket and chain by the oncoming fowl or by operators of the processing line. The forward end of the second guide rod 46 terminates in a loop 54 extending in front of the idler sprocket 16, as best shown in FIG. 1.

A number of movable cutting assemblies 56 are secured to the chain 14 at intervals therealong and move with the chain. Each movable cutting assembly 56 includes a horizontal blade 57 extending outwardly from a bracket 58 attached to the outside of the chain 14 so as not to interfere with movement of the chain around the sprockets 15 and 16. The leading edge 59 of each blade 57 is beveled to form a shearing surface.

The horizontal blades 57 extend outwardly from the chain brackets 58 to an outer edge 60 which ovelies and extends a short distance beyond the lower guide rod 42 and the front plate 36 of the stationary knife assembly 20. A vertical plate 63 joins each horizontal blade 57 at the outer edge 60 and extends downwardly therefrom. As best seen in FIGS. 2 and 3, the downwardly-extending vertical plate overlies the front plate 36 of the stationary knife assembly 21 and is spaced a short distance outwardly from that front plate, so that the vertical plates 63 of the moving cutter assemblies 56 can move along the front plate 36 without interference therewith.

The operation of the oil bag cutting apparatus is now described. Birds suspended from the shackles in the usual manner are conveyed to the oil bag cutting apparatus 10, where the birds initially move into contact with the lower guide rod 42 and then into contact with the upper guide rod 46. The vertical spacing of the cutting apparatus 10 below the overhead conveyor system is important to the proper operation of the apparatus, and the lower guide rod 42 should be located just below the elevation of the tail and oil bag on the birds arriving at the apparatus. This positioning of the lower guide rod 42 is illustrated in FIG. 3, showing a fragmentary portion of a bird 65 having an oil bag 66 disposed on top of the horizontal plate 24, immediately below the tail 67 of the bird. It should thus be understood that the back of the bird contacts and thereafter slides along the lower guide rod 42, with the oil bag 66 and tail 67 located below the lower guide rod and riding up the ramp surface 39 to arrive on the horizontal surface 33 of the stationary knife assembly 20.

Each moving cutter assembly 56 is laterally displaced on the chain 14 relative to the position of the shackle with which the moving cutter assembly is synchronized. This lagging relationship is illustrated in FIG. 3, where the moving cutter assembly 56 moves with and a short distance behind the bird 65 traversing the stationary knife assembly 24. At the time depicted by FIG. 3, the oil bag 66 has just moved through the gap 34 between the edge 32 and the confronting outer end 31 of the rod 29 extending in front of the V-shaped notch 25. However, the tail 67 of the bird extends rearwardly beyond the oil bag 66 and beyond the outer end 31 of the rod 29. The tail 67 thus cannot enter the gap 34 leading to the notch 25, but instead is guided upwardly by the rod 29 to ride along the upper surface of the horizontal plate 24. As forward motion of the bird 65 and the moving cutting assembly 56 progresses, the oil bag 66 moves into the V-shaped notch 25 and is drawn against the converging edges 26 of that notch. The leading edge of the vertical plate 63 forming part of the moving cutter assembly contacts the bird 65 and helps move the bird alon the lower and upper rails at this time. The shearing surface 59 of the horizontal blade 57 in the moving cutting assembly then moves across the plate 24 of the stationary knife assembly 20, shearing the oil bag 66 from the bird 65 as the shearing surface 59 moves across the edges 26 of the stationary knife assembly. The bird 65 continues to move past the stationary knife assembly and is carried away from the apparatus 10 by the overhead conveyor system.

It should be understood that the foregoing relates only to a preferred embodiment of the present invention, and that numerous changes and modifications therein may be made without departing from the spirit and scope of the invention as defined in the following claims.

What is claimed is:

1. Apparatus for removing the oil bag from fowl moving along a predetermined path, comprising:
    cutting means disposed in certain relation to the path and defining an entry throat for receiving the oil bag of a fowl moving along the path, the cutting means comprising
    a pair of sides mutually converging from the entry throat for receiving the oil bag of an oncoming fowl which approaches the throat along a first side thereof, and
    a knife to cut the oil bag from the fowl; and guide means disposed adjacent to the entry throat and engaging the tail of the moving fowl to prevent the tail from moving into the entry throat, so that the tail is not cut as the oil bag enters the entry throat to be removed from the fowl by the knife, the guide means including a member at one side of the throat and having a guide surface extending across the path in front of the throat to engage the tail of an oncoming fowl and displace the tail from the entry throat.

2. Apparatus as in claim 1, wherein the member of the guide means only partially blocks the throat, leaving an opening operative to permit entry into the throat of the oil bag on an oncoming fowl.

3. Apparatus as in claim 1, wherein:
    the cutting means comprises a surface disposed substantially normal to the longitudinal axis of oncoming fowl and having a side facing the predetermined path, so that the fowl travel alongside the surface;
    the converging sides are formed in the surface;
    the surface is located at an elevation relative to the oncoming fowl allowing the oil bag and the tail of the fowl to move toward the entry throat approximately in the plane of the surface as the fowl approaches the surface; and
    the member of the guide means extends partially across the entry throat from the side thereof opposite the facing side so as to prevent entry of the tail but not so far as to block entry of the oil bag into the entry throat.

4. Apparatus for removing the oil bags from a succession of fowl moving seriatim along a predetermined path, comprising:
    stationary cutting means including a pair of sides mutually converging to define a V-shaped entry throat for receiving and engaging the oil bag of a fowl moving along the path;
    means movable in relation to the cutting means to sever from the fowl an oil bag received in the throat; and
    a member extending forwardly from a side of the cutting means in the direction of the oncoming fowl and having an outer surface partially blocking the entry throat so as to engage the tail of the oncoming fowl and deflect the tail from entering the throat.

5. Apparatus for removing the oil bag from the fowl suspended from an overhead conveyor moving along a predetermined path, comprising:
    a chain moving in synchronism with the overhead conveyor along a closed substantially horizontal path at a distance below the overhead conveyor substantially coplanar with the oil bags of fowl suspended from the overhead conveyor and traversing the chain;
    a fixed cutting element mounted adjacent to the chain in position to receive the oil bag of the suspended fowl;
    a plurality of movable cutting elements carried by the chain and movable therewith for successive shearing engagement with the fixed cutting element so as to sever the oil bags from the fowl; and
    guide means disposed adjacent the fixed cutting element for engagement by the tail of the moving fowl to deflect the tail away from the fixed cutting element, so that the tail is not cut by said shearing engagement.

6. Apparatus as in claim 5, wherein:
    the fixed cutting element comprises a first plate in spaced relation to the chain;
    a slot formed in the plate and having a pair of sides mutually converging to define an entry throat facing the oncoming fowl so as to receive and engage the oil bag of each fowl moving along the path; and
    the movable cutting elements successively pass along the plate in shearing relation to the slot so as to shear the oil bags entering the slot.

7. Apparatus as in claim 6, wherein:
    the guide means includes a member extending in the path in front of the entry throat and having a surface directed to one side of the throat so as to engage the tail of an oncoming fowl and displace the tail away from the entry throat.

8. Apparatus as in claim 6, wherein:
    each movable cutting element comprises a second plate movable with the chain to pass alongside the first plate in close proximity thereto so as to create a shearing action each time a second plate passes alongside the first plate.

9. Apparatus as in claim 8, wherein:
    the first plate lies in a plane substantially parallel to the chain, with the slot extending in front of the chain along the path of travel of the fowl; and
    the second plates each extend forwardly from the chain to wipe along the first plate, thereby creating the shearing action.

10. Apparatus as in claim 9, further comprising:
    a fixed vertical plate adjoining the first plate and extending downwardly therefrom to engage the tail of each fowl traversing the first plate as the oil bag thereof enters the slot; and
    a vertical plate associated with each movable cutting element and extending downwardly therefrom to move along the fixed vertical plate and assist the fowl therealong.

11. Apparatus as in claim 6, wherein:
    the fixed cutting element is positioned below the chain, and further comprising;
    a guide bar located above the chain in spaced-apart relation to the movable cutting elements, thereby defining a space between the guide bar and the fixed cutting element to receive the oil bag and tail of each fowl suspended from the overhead conveyor.

12. Apparatus for removing the oil bag from fowl suspended from an overhead conveyor moving along a predetermined path, comprising;
- a chain moving in synchronism with the overhead conveyor along a closed substantially horizontal path at a distance below the overhead conveyor substantially aligned with the oil bags of fowl suspended from the overhead conveyor and traversing the chain;
- a fixed cutting element mounted adjacent to the chain in position to receive the oil bag of the suspended fowl and comprising a pair of sides mutually converging to define a V-shaped entry throat for receiving and engaging the oil bag of a fowl moving along the path;
- a plurality of movable cutting elements operatively associated with the chain and movable therewith for successive shearing engagement with the fixed cutting element so as to sever the oil bags from the fowl; and
- a guide means disposed adjacent the fixed cutting element for engagement by the tail of the moving fowl to deflect the tail away from the fixed cutting element, so that the tail is not cut by said shearing engagement, the guide means comprising a member extending forwardly from one side of the fixed cutting element in the direction of the oncoming fowl and having an outer surface partially blocking the entry throat so as to engage the tail of the oncoming fowl and prevent the tail from entering the throat.

13. Apparatus for removing the oil bag from fowl suspended from an overhead conveyor moving along a predetermined path, comprising:
- a chain moving in synchronism with the overhead conveyor along a closed substantially horizontal path at a distance below the overhead conveyor substantially aligned with the oil bags of fowl suspended from the overhead conveyor and traversing the chain;
- a fixed cutting element mounted adjacent to the chain in position to receive the oil bag of the suspended fowl;
- a plurality of movable cutting elements operatively associated with the chain and movable therewith for successive shearing engagement with the fixed cutting element, the movable cutting elements being carried by the chain in offset relation to the position of the fowl suspended from the overhead conveyor, so that the oil bag of each such fowl enters the V-shaped entry throat and thereafter is shearingly engaged by the movable cutting element offset from the fowl; and
- a guide means disposed adjacent the fixed cutting element for engagement by the tail of the moving fowl to deflect the tail away from the fixed cutting element, so that the tail is not cut by said shearing engagement.

* * * * *